United States Patent [19]

Fitzsimmons et al.

[11] Patent Number: 5,236,081
[45] Date of Patent: Aug. 17, 1993

[54] COMPACT DISC PACKAGE

[75] Inventors: William T. Fitzsimmons, Kennebunkport; Craig Lovecky, Old Orchard Beach, both of Me.

[73] Assignee: Shape Inc., Biddeford, Me.

[21] Appl. No.: 830,325

[22] Filed: Jan. 31, 1992

[51] Int. Cl.$^5$ .................................... B65D 85/57
[52] U.S. Cl. .................. 206/44 R; 206/310; 206/313; 493/100
[58] Field of Search ............ 206/303, 307–313, 206/444, 807, 44 R; 493/93, 100

[56] References Cited

U.S. PATENT DOCUMENTS

| | | |
|---|---|---|
| 1,502,312 | 7/1924 | Mayhew . |
| 3,116,005 | 12/1963 | Skaggs . |
| 3,556,391 | 1/1971 | Kosterka . |
| 4,176,744 | 12/1979 | Borzak . |
| 4,327,831 | 5/1982 | Inaba et al. . |
| 4,478,335 | 10/1984 | Long et al. . |
| 4,511,034 | 4/1985 | Pan . |
| 4,519,500 | 5/1985 | Perchak . |
| 4,535,888 | 8/1985 | Nusselder . |
| 4,620,630 | 11/1986 | Moss ................................ 206/313 |
| 4,635,792 | 1/1987 | Yamada et al. . |
| 4,702,369 | 10/1987 | Philosophe . |
| 4,709,812 | 12/1987 | Kosterka . |
| 4,760,914 | 8/1988 | Gelardi ............................ 206/807 |
| 4,771,883 | 9/1988 | Herr et al. . |
| 4,874,085 | 10/1989 | Grobecker et al. . |
| 4,925,023 | 5/1990 | Goldblatt et al. . |
| 5,101,971 | 4/1992 | Grobecker ....................... 206/310 |

FOREIGN PATENT DOCUMENTS

| | | |
|---|---|---|
| 1198208 | 12/1985 | Canada . |
| 130266 | 1/1985 | European Pat. Off. . |
| 221749 | 5/1987 | European Pat. Off. . |
| 3414903 | 10/1985 | Fed. Rep. of Germany . |
| 3425579 | 1/1986 | Fed. Rep. of Germany . |
| 1050913 | 1/1954 | France . |
| 2091219 | 7/1982 | United Kingdom . |
| 2135274 | 8/1984 | United Kingdom . |
| 2147262 | 5/1985 | United Kingdom . |
| 85/01033 | 3/1985 | World Int. Prop. O. . |
| 86/07182 | 12/1986 | World Int. Prop. O. . |

OTHER PUBLICATIONS

"Music Firms Try Out 'Green' CD Boxes", Meg Cox The Wall Street Journal, Jul. 25, 1991.
The New York Times, article entitled "Smaller CD Boxes Promised Amid Clamor About Waste", Feb. 28, 1992.
The Wall Street Journal, Section "Marketplace", article entitled CD Marketers Will Eliminate Paper Packaging, Feb. 28, 1992.
Billboard, article entitled "CD Packaging Dilemma Spills Over to NARM Meet", Mar. 30, 1991.

Primary Examiner—Jimmy G. Foster
Attorney, Agent, or Firm—Staas & Halsey

[57] ABSTRACT

A CD package is provided, including a pivotable CD holder and a foldable cardboard cover. The holder includes a square central panel and two side, substantially rectangular profile "flip" panels each with a substantially semicircular cutout corresponding to half of a CD. The cover includes four portions separated by strips, each portion foldable relative to each other, and a plurality of cutouts to temporarily receive projections formed on the underside of the holder. The cover is slidably received within clasps, also formed on the underside of the holder. The flip panels are pivoted, coplanar to the central panel to create a retail configuration, with two portions of the cover extending over each of the front and back, respectively, of the holder. The cover and holder are then shrink wrapped together. This retail configuration forms a rigid "long box" since the holder spans cover strips. The consumer removes the shrink wrap, unfolds the cover and removes the CD. In order to store the CD, the CD is replaced in the holder, the flip panels are pivoted on top of the central panel, the holder is moved upward slightly and longitudinally along the cover to be bordered by two strips and the remaining portions of the cover are folded over the CD holder, thereby forming a compact CD package.

35 Claims, 9 Drawing Sheets

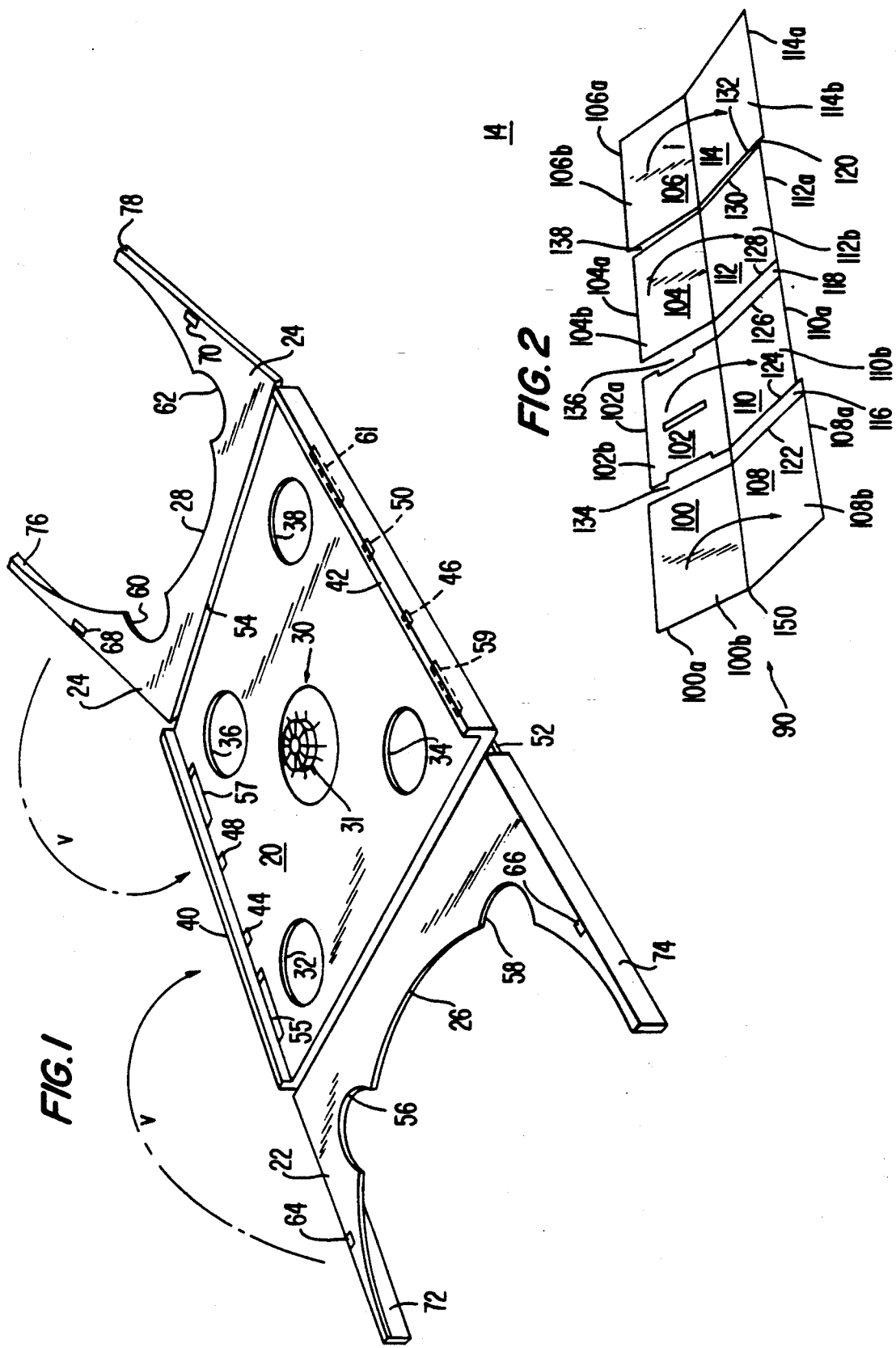

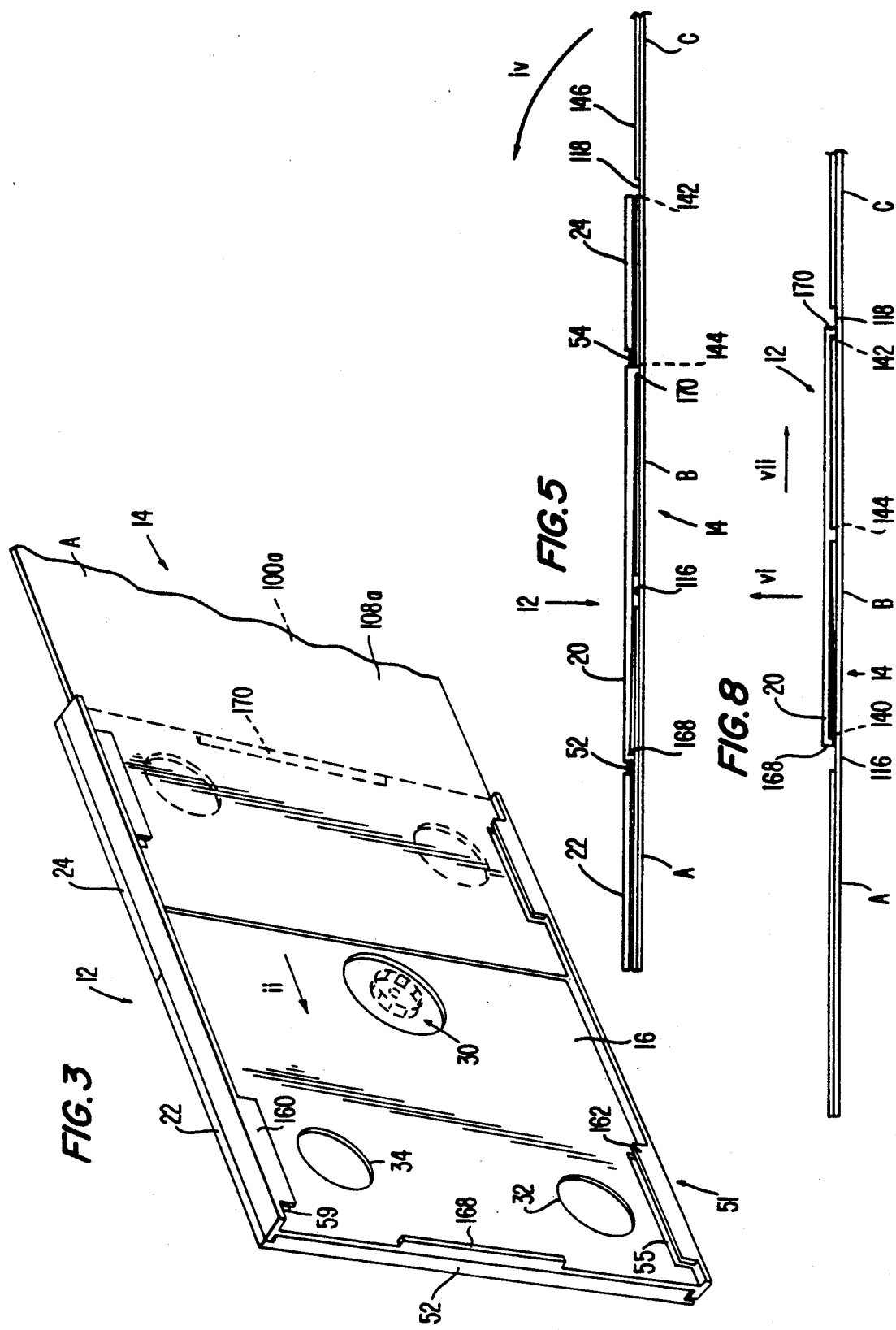

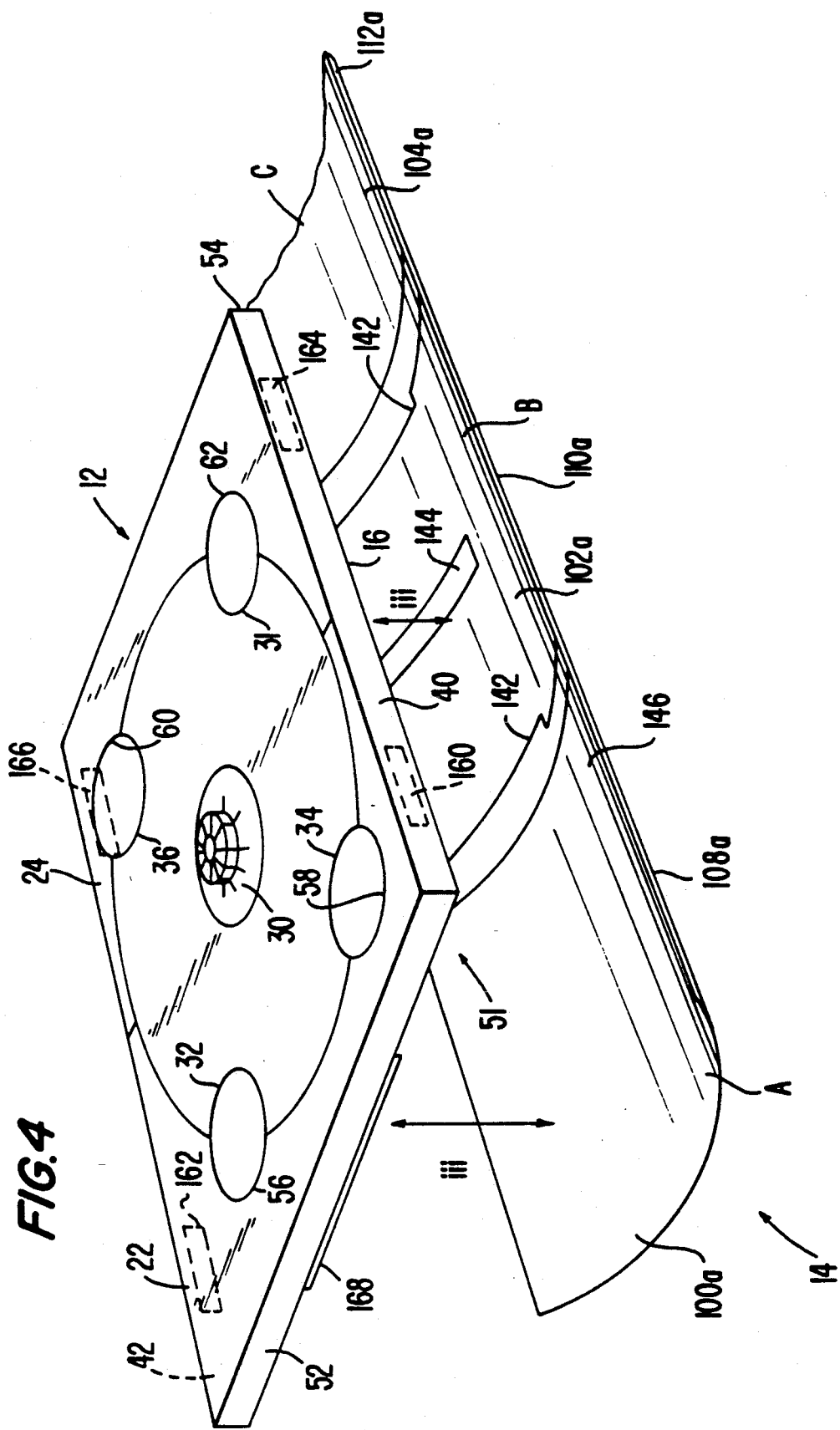

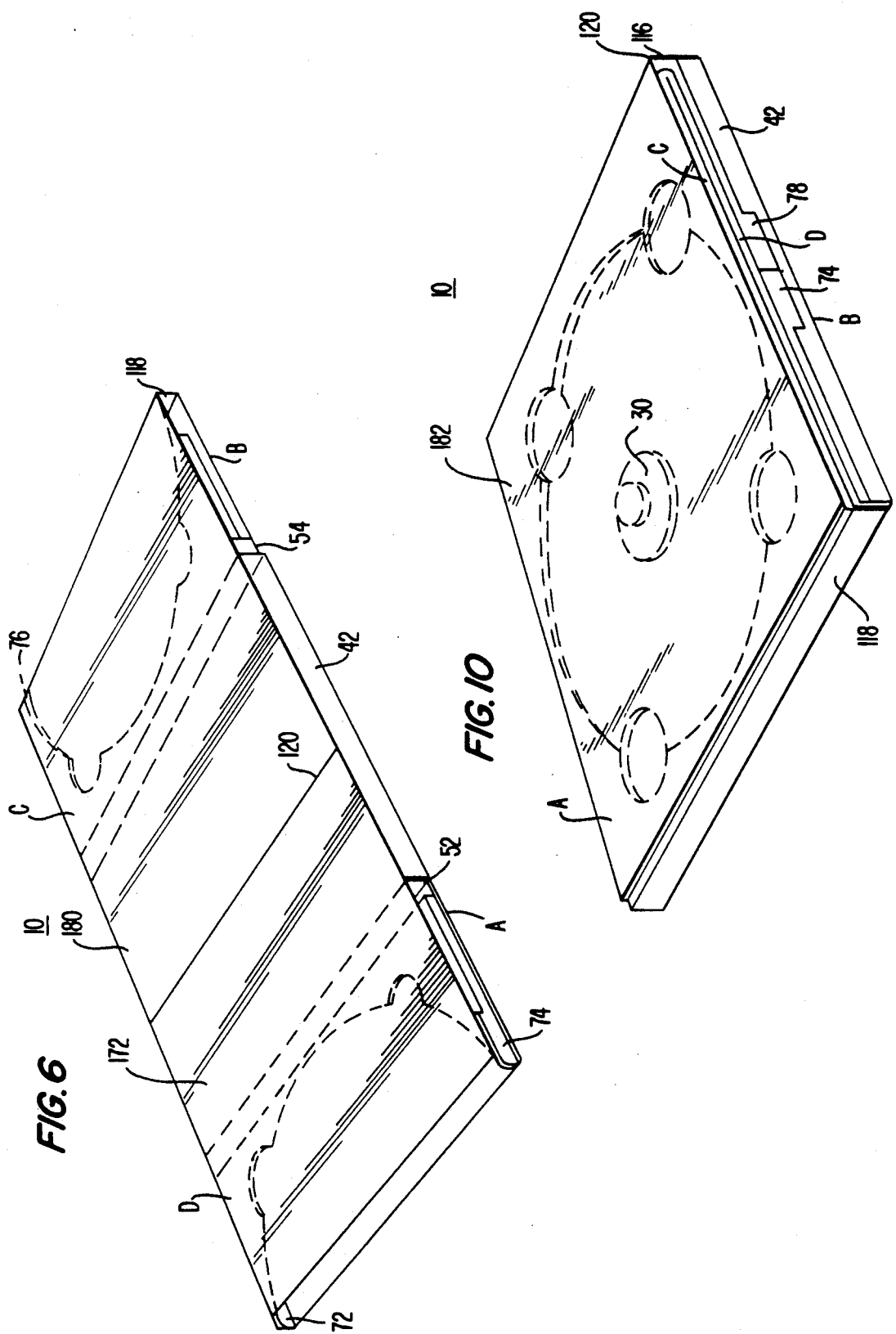

COMPACT DISC PACKAGE

BACKGROUND OF THE INVENTION

This invention relates to storage devices for magnetic media and, more particularly, to a more ecological compact disc (CD) package, including a CD holder and cover for the holder, which serves to deter theft at the retail level and protectively stores the CD when not in use.

The most popular CD currently is a 4.7 inch diameter metallized plastic disc. Since it is susceptible to scratching, smudging and other signal eroding damage, said CD's are preferably protected in a storage device when not being used in a CD player.

The predominantly used storage device for the CD is the "jewel box". The conventional jewel box includes clear front and back panels and an opaque compact disc holder which snap-fits into the back package panel. The front and back panels of the jewel box are normally hingedly connected along one edge to open like a book. At least one preprinted insert is included in and visible through the jewel box. Upon opening the jewel box, the customer can readily slide the insert out, if desired, and examine it.

This jewel box, though attractive in quality, appearance and feel, is cumbersome, difficult and expensive to construct, since it includes at least three separate plastic pieces which must be fit together, and, normally, the preprinted insert must be positioned, in addition to the CD itself.

The closed jewel box, with CD inside, is placed in a preformed cardboard "long box" (about 6×12 inches), to maximize graphics and prevent theft at the retail level. Once purchased, the long box is discarded and the jewel box only is used for storing the CD when not in use.

This conventional CD package, including the jewel box and cardboard cover, has been criticized by environmental groups because of its use of a non-biodegradable material (i.e., plastic) in great quantities due to the sheer volume of CD's being sold, and of a valuable resource (i.e., cardboard/paperboard) in great quantities due to the oversized nature of the packaging relative to the jewel box. See *Wall Street Journal*, Jul. 25, 1991, page 31, "Music Firms Try Out 'Green' CD Boxes."

More particularly, as with any consumer goods today, there is a strong interest in making packaging more ecological. The less waste, the better. In light of the fact that millions of CD's are produced and sold each year, there is a need to package CD's in a more ecological manner.

Further, with CD packaging, as with all plastic consumer goods, a need exists to find ways to recycle the products instead of merely depositing them in land fills: In order to make recycling more desirable, it is important to make different materials, such as plastic and cardboard, easily separable.

Someday, it may even be necessary to reuse CD packaging. If a CD is lost, damaged or otherwise discarded, the consumer might retain the CD package to receive a new CD and new graphics. In order for this to be possible, the graphics must be easily replaceable.

There have been attempts to combine features of the jewel box and the long box into the same package to simplify its design. One example is described in U.S. Pat. No. 4,709,812, wherein, in an unassembled state, a rectangular paperboard sheet is divided into two rows of three sections each. Several sections of a first row are separated from each other by relatively thin strips and these strips are bounded respectively by fold lines. Several sections of a second row are separated from each other by slots. Printing or art work can be applied to the lower faces of all but one of the sections. During assembly, the sections of the first row are folded over along a central, longitudinal fold line on top of the second row and glued down. The width of slots are chosen to be slightly wider than the width of the strips so that when a section is folded over on top of another section the slot does not extend across the fold line. After the folding operation is completed, a CD holder is glued to the lower face of an end section. The remaining sections are folded over the CD holder. Finally, the folded package is inserted into a cardboard long box and shrink wrapped.

Alternatively, in a joint venture between the assignee herein and Ivy Hill Records, a CD package was developed which seeks to improve upon the package described in U.S. Pat. No. 4,709,812. In this CD package, there is a holder for a compact disc including a tray adapted to releasably receive a compact disc thereon, and a base in telescopic relationship with the tray. Either the tray or the base is still glued to a section of a foldable cardboard cover. The holder is convertible from a spanning configuration wherein the base and tray are in a substantially untelescoped retail configuration, i.e., slid open, with the cardboard cover forming the long box, to a telescoped storage configuration, wherein the base and tray are slid together, one inside the other, with the cardboard cover folded therearound. In the retail configuration, a separate cap is used at one end for rigidity.

The drawbacks associated with these CD packages follow. If a defect is found in either the CD holder or cover after gluing, the CD holder and cover cannot be separated without damaging the cover and/or CD holder. These parts could not be reused, but would have to be scrapped, which increases overall production and energy costs. The glued CD holder/cardboard cover combinations also frustrate recycling because it is time consuming and inefficient to separate the plastic holder from the cardboard. The joint venture package, in particular, uses more material and parts than necessary, and may inadequately support the middle of the retail configuration.

Accordingly, the prior art still does not provide the most cost-efficient CD package which produces the least waste, is easy to assemble, disassemble, recycle and reuse, and yet which fully serves to prevent theft at the retail level and protectively store the CD when not in use.

SUMMARY OF THE INVENTION

Accordingly, it is a purpose of the present invention to provide a CD package which minimizes waste, in both the retail and storage configurations.

It is another purpose of the present invention to provide a CD package which is less costly to produce.

It is another purpose of the present invention to provide a CD package which is more ecological since the components thereof can be more easily separated for reuse or recycling.

It is another purpose of the present invention to provide a CD package whose size, in the retail configuration, is as thin as possible to maximize use of the retail space available.

It is another purpose of the present invention to provide a CD package with maximum potential graphics area.

It is another purpose of the present invention to provide a CD holder that is movable relative to a cardboard cover between a rigid retail configuration and a foldable storage configuration.

It is another purpose of the present invention to eliminate the adhesive mating of the CD holder and the cardboard cover by using a mechanical connection therebetween.

It is another purpose of the present invention to provide a CD holder easily pivotable from a first larger size to a second, smaller size, and back again.

It is another purpose of the present invention to provide a CD package which prevents theft by, e.g., providing enough rigidity in the mid-section of the retail configuration to prevent folding and concealing the package.

It is another purpose of the present invention to provide an attractive, durable package in which to display, sell and store a compact disc.

It is another purpose of the present invention to provide a CD package which is simple and inexpensive to manufacture and yet shares the benefits of the popular jewel box.

Finally, it is a purpose of the present invention to provide a CD package which the consumer can easily transform from the retail to the storage configurations.

To achieve the foregoing and other purposes of the present invention, there is provided, in one embodiment, a CD package including a pivotable CD holder and a foldable cardboard cover. The CD holder includes a rectangular central panel and two side, substantially rectangular profile "flip" panels with substantially semicircular cutouts corresponding, in combination, to the diameter of the CD. The cardboard cover includes two rows of four sections each which are folded over on each other and glued to form four portions foldable relative to each other. The cardboard cover includes a plurality of notches to receive projections formed on the underside of the CD holder. The cardboard cover is slidably received within clasps formed on the underside of the CD holder. The flip panels are folded out and lay flat, coplanar to the central panel in the "retail" configuration, with two portions of the cardboard cover extending over each of the front and back, respectively, of the CD holder and the cardboard cover and CD holder are then shrink wrapped together. This configuration forms a rigid "long box" since the holder spans fold strips of the cardboard cover. The consumer removes the shrink wrap, unfolds the cardboard cover and removes the CD. In order to store the CD, the CD is replaced in the holder, the flip panels are folded on top of the central panel, the CD holder is moved longitudinally along the cardboard cover to be bordered by two fold strips and the remaining portions of the cardboard cover are folded over the CD holder, thereby forming a compact CD package.

In the second embodiment, first and second nesting rectangular panels are connected by hinges at, adjacent respective sides of the panels. The panels are pivoted on the hinges to be coplanar, wherein, the hinges cover fold strips, along with the rectangular panels and cardboard cover, produce the rigid long box. The consumer removes the CD, pivots the panels back into the nested position, moves the CD holder longitudinally of the cardboard cover and folds the remaining cardboard cover portions over the CD holder as described above.

The methods of assembly according to the present invention include the steps of either longitudinally sliding the cover into the clasps on the underside of the CD holder or bending the cardboard cover longitudinally, pulling in the sides and, with the CD holder positioned over the compressed cardboard cover, releasing the cardboard cover to allow the edges thereof to slip underneath the clasps.

The CD package of the present invention serves two purposes. The first, in the store, packages the CD in a form similar in size to the conventional long box while still maximizing the graphic areas. The second function is to fold up into a package size the consumer can fit into existing racks and home storage files designed to be used with the conventional jewel box only.

With this structure, there is no waste except for the shrink wrap. Also, only two separate pieces, one plastic and one paper are required. The two are mechanically joined, easily assembled, easily disassembled and recyclable. The retail form exhibits consistent thickness, visual appeal and rigidity. However, the retail form is thinner than usual for filing, shipping, storing and displaying. Sidewalls on the CD holder protect the CD from the side and from above and also serve as a theft deterrent. In the storage form, the entire CD package has the exact same outer dimensions as the conventional jewel box.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a perspective view of the CD holder according to a first embodiment of the present invention.

FIG. 2 is a perspective view of one embodiment of the cardboard cover according to the present invention.

FIG. 3 is a perspective view of one method for attaching the cardboard cover to the underside of the CD holder.

FIG. 4 is a perspective view of another method for attaching the cardboard cover to the underside of the CD holder.

FIG. 5 is a side view of the CD holder in the retail position on the cardboard cover.

FIG. 6 is a perspective view of the CD holder in the retail configuration.

FIG. 8 is a side view of the CD holder in the storage position on the cardboard cover.

FIG. 10 is a perspective view of the CD holder in the storage configuration.

DESCRIPTION OF THE PREFERRED EMBODIMENTS

The preferred embodiments of the CD package according to the present invention will now be described with reference to FIGS. 1-13.

Generally the CD package, which is denominated by reference . numeral 10 (FIGS. 6 and 10), includes a combination of a pivotable CD holder 12 and a foldable cover 14.

FIG. 1 shows a CD holder 12 according to a first embodiment of the present invention. The CD holder 12 is preferably injection molded as a unitary body of a conventional injection molded plastic material.

Figure 9:
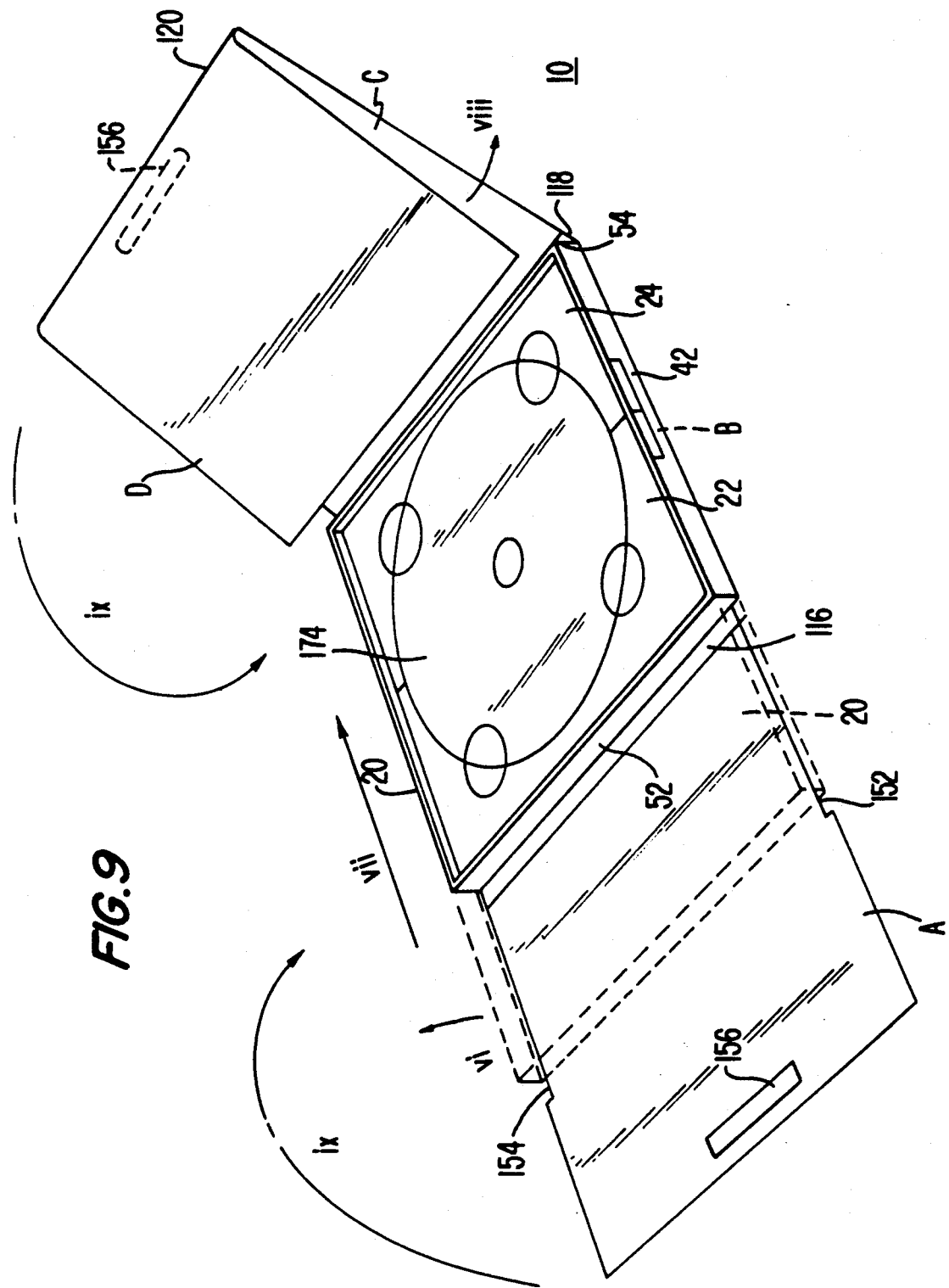
FIG. 9 is a perspective view showing the CD holder being moved from its retail position on the cardboard cover to the storage position.

The CD holder 12 includes a rectangular central panel 20 and two side, substantially rectangular profile "flip" panels or wings 22, 24. Each flip panel or wing 24, 26 is about one-half the size of the central panel 20, is integrally molded with the central panel 20 and is connected by a living hinge 52, 54. Alternatively, the flip panels 24, 26 can be molded separately, and attached mechanically or otherwise. Each flip panel 22, 24 has a substantially semicircular cutout 26, 28. The cutouts 26, 28 combine, when the flip panels are folded in adjacent each other, as described below, to form a circle having a diameter slightly greater than the diameter of a CD 174 (FIG. 9).

The central panel is preferably about 5⅜ inches square. Each flip panel 22, 24 is about 2-11/16 inches wide and 5⅜ inches long. The living hinges 52, 54 are each about 5/16 inches wide. The height of the CD holder 12 with the flip panels 22, 24 folded on top of the central panel 20 is a little less than 5/16 of an inch.

The central panel 20 includes means 30 for receiving the CD. Any of the conventional means for providing frictional engagement between the CD holder 12 and the circumference of the central hole of the CD 174 can be used. Preferably, upstanding pliable plastic tabs 31 form the means 30, such as those used in the conventional jewel box. The means 30 can be molded in, snapped in, welded in, screwed in, or co-injection molded.

Four corner finger holes 32, 34, 36 and 38 are formed in the central panel 20 at radially spaced positions relative to the CD holding means 30. The finger holes 32-38 extend through the central panel 20 to make it easier to grab the CD. The holes 32-38 can also be used in automated assembly and disassembly to locate and manipulate the CD holder 20.

The central panel 20 also includes two opposed, upstanding sidewalls 40, 42 and pairs of spaced latches 44, 48, and 46, 50 adjacent to each sidewall 40, 42, respectively. There are also four elongated openings 55, 57, 59, and 61 formed near the corners of the central panel 20 which correspond to cover receiving means 51 described below.

The flip panels 24, 26 each include two smaller semicircular cutouts 56, 58 and 60, 62 at the corners thereof, respectively, which correspond to the finger holes 32-38 formed in the central panel 20.

Figure 7:
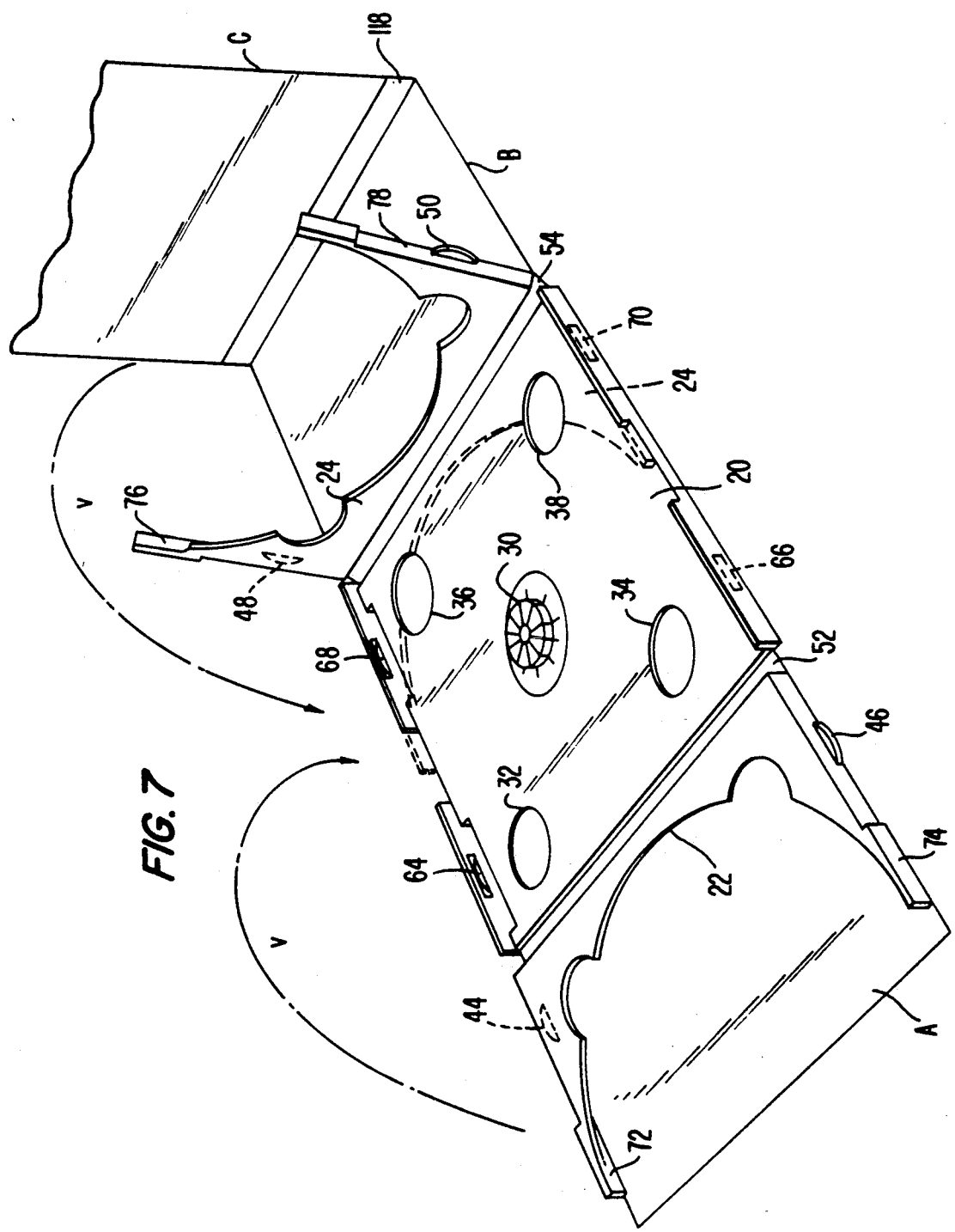
FIG. 7 is a perspective view of the CD holder being moved from the retail configuration to the storage configuration.

Each flip panel 22, 24 also includes a recess 64, 66 and 68, 70 for respectively receiving a corresponding latch 44-50, formed in the central panel 20. As can be seen in FIG. 7, the locations of the latches 44-50 and recesses 64-70 can be reversed, and the shapes can be changed, while still serving the same purpose. Each flip panel 22, 24 also includes sidewalls 72, 74 and 76, 78, respectively.

FIG. 2 is a perspective view of the foldable cover 14 according to the present invention in its unassembled state. The cover 14 of the present invention is preferably comprised of a rectangular, preprinted paperboard or cardboard blank 90, which provides strength for the package and protection for the CD therein. Suitable alternatives to paperboard/cardboard include plastic, foil-laminated paperboard, acetate (film) laminated paperboard and vinyl laminated paperboard. In lieu of preprinting, other means of expressing concepts, such as embossing, stamping, leaf stamping, or the like can be used.

The blank 90 is prescored into preferably eight sections 100, 102, 104, 106, 108, 110, 112 and 114. Printing or art work can be applied to the lower faces 100a-114a of all sections 100-114.

The sections 108, 110, 112 are separated from each other by strips 116, 118 which are bounded respectively by fold lines 122, 124 and 126, 128, respectively. Sections 112, 114 are separated by a thinner strip 120, bounded by fold lines 130, 132. Sections 100, 102, 104 and 106 are separated from each other by slots 134, 136 and 138 for reasons to be explained below. The slots 134, 136 are wider than the slot 138.

For a clean appearance and greatest structural integrity, the width of strips 116, 118, 120, that is, the distance between fold strips 122, 124, 126, 128 and 130, 132 should be just slightly greater than the depth of the CD holder 12 plus the thickness of two portions A-D of the cover 14, described below. When these dimensions are adhered to the resulting CD package forms a tight, protective enclosure for the CD within.

The section 102 includes on transverse sides thereof (which help to define the slots 134, 136) cutouts or notches 140, 142 and the interior of the section 102 includes a similarly sized notch 144. The panels 102, 104, 110 and 112 are formed to be slightly narrower in the transverse direction than the sections 104, 106, 112 and 114, due to the longitudinal cutouts 152, 154 (FIG. 9), again for reasons discussed below.

During assembly, the cover 14 is folded along a central longitudinal fold line 150 (in direction of arrow "i") so that sections 100-106 are folded onto the sections 108-114. More particularly, the upper surfaces 100b-106b are caused to abut the upper surfaces 108b-114b and are glued thereon. After gluing, there are formed four rectangular portions A, B, C and D of the cover 14.

The width of slots 134, 136, 138 are chosen to be slightly wider than the width of strips 116, 118, 120 so that, for example, when section 104 is folded over on top of section 112 the slot 138 does not extend across the fold lines 130, 132. After the folding and gluing operations are completed, the cardboard cover 14 is inserted into the CD holder 12, as discussed below.

The preferred embodiment described above includes eight sections 100-114 folded and glued to provide four portions A-D. However, the present invention also contemplates other types of covers 14. For example, four unfolded and unglued sections can be used, each covered on both sides with graphics. Of course, each panel should be of sufficient rigidity. Alternatively, covers 14 having 4 or 6 sections folded and glued to form 2 or 3 portions, can also be used. Other combinations are possible, such as using only sections 100, 104, 108, 110, 112, with sections 100 and 104 folded and glued to sections 108 and 112, respectively.

FIGS. 3 and 4 show different methods for assembling the cover 14 relative to the CD holder 12.

FIG. 3 shows one end of the cardboard cover 14 (portion A) being mated with cover receiving means 51. The means 51 can be opposed clasps or receptacles 160, 162, 164, 166 formed on the underside 16 of the CD holder 12. Alternatively, plastic clips could be formed on the CD holder 12 underside 16 which slide in elongated longitudinal tracks cutout in the cover 14 (not shown). Note the sidewalls 40, 42 locate the CD holder 12 on the cardboard cover 14. The cover 14 is pushed along the underside 16 of the CD holder 12 in the direction of arrow "ii" until an elongated transverse projection or rib 170 formed on an edge of the underside 16 of the CD holder 12 engages the die cutout area 144 (formed in the top layer 146 of the cover 14 in section 102). See FIG. 5. This is known as the retail position. Moved into another position, the storage position, a second transverse latch 168, along with latch 170, catch in cutouts 140 and 142, respectively, to keep the CD holder 12 from sliding forward or backward. See FIG. 8.

In FIG. 4, the cardboard cover 14 is bent longitudinally and the longitudinal edges thereof are fit within the clasps 160, 162, 164, 166 formed on the underside 16 of the CD holder 12 as the cover 14 is moved in the direction of arrow "iii". The cooperation of the projections 168, 170 and cutouts 140, 142, 144 are the same as described above in the retail and storage positions.

Thus, according to the present invention, the CD holder 12 is mechanically attached to the cover 14 with the four molded-in clasps 160-166. These clasps 160-166 are formed within the conventional jewel box width and height dimensions and are tolerant, allowing the CD holder 12 to slide on the cardboard cover 14 when transforming from the retail to the storage configurations.

The cover 14, if desired, can be removed from the CD holder 12 by reversing the above steps. More particularly, the cover 14 is merely moved longitudinally in a reverse direction or the cover is bent and removed from underneath the CD holder clasps 160-166.

As shown in FIGS. 5 and 6, the CD holder 12 is attached to the cardboard cover 14 in the retail position, with the central panel 20 extending over the strip 116, the flip panels 22, 24 extending coplanar with the central panel 20 and the portions A, B of the cardboard cover 14 extending along the underside 16 of the unfolded CD holder 12. The coplanar portions C, D of the cardboard cover 14 are then folded over the top of the CD holder 12 in the direction of arrow "iv". The strip 118 then becomes a spine label area, where information regarding the artist, title, etc., can be displayed, as usual.

Locating the middle section of the CD holder 12 over the strip 116 between the portions A and B in the retail configuration adds strength and integrity to the CD package 10. The CD holder 12 and cardboard cover 14 are then shrink wrapped together to form the final retail configuration 170 (see FIG. 6). The shrink wrap is shown by reference numeral 172.

After purchase, the consumer removes the shrink wrap 172. As shown in FIGS. 7-9, the flip panels 20, 22 are then folded inward along arrows "v" onto the central panel 20, by means of the double living hinges 52, 54 on both sides of the central panel 20. The hinges 52, 54 are now in a vertical position becoming part of the outer sidewalls of the CD holder 12. The flip panels 22, 24 are secured to the central panel 20 with, e.g., the mechanical latches 44-50 fitting into slots 64-70, respectively.

The CD holder 12 is then lifted slightly relative to the cover 14 along arrow "vi" (FIG. 9), projection 170 overcoming the cutout 144 formed in the cardboard cover 14, and moved along arrow "vii" (FIG. 9) so that the CD holder 12 rests on portion B. When the CD holder 14 is fully in place on section B, the projections 168, 170 secure the CD holder 12 in position via the cut outs 140, 142.

Note in FIG. 9, the longitudinal cutouts 152, 154 formed on the sides of the cardboard cover 14 in the area that the CD holder 12 slides, to compensate for the thickness of the sidewalls 40, 42.

When the CD holder 12 has been put into place on portion B, i.e. the storage position, the cardboard cover 14 can then be folded up into the storage configuration. Particularly, portion D is folded over portion C along arrow "viii" and then both portions C and D are folder over the CD holder 12 along arrow "ix". Finally, portion A is folded over portions C and D along arrow "x". Portion A of the cover 14 can be secured to the portion C of the cover 14 by securing means 156, e.g., magnetic strips, VELCRO strips, easily separable adhesive strips, etc., to form the storage configuration 182 (see FIG. 10).

The result is a CD package 10, in the storage configuration 182, including both a CD holder 12 and cardboard cover 14, that is the exact size as only the conventional jewel box, with sidewalls 40, 42, 52, 54 that completely conceal and protect the CD 174.

In summary of the first embodiment, the CD holder described above is made up of a plurality of pivotable pieces positioned in a foldable cardboard cover. A central panel thereof is positioned over a strip in the cardboard cover to prevent the CD package from bending in the middle. The central panel also contains the compact disc, thus acting as a deterrent for shoplifters to bend the package to steal. Another deterrent is the sidewalls 40, 42 formed on the central portion of the CD holder for protecting the disc. The left and right flip panels 22, 24 of the CD holder 12 also provide further support to the cardboard cover 14 and shrink wrap 172. Contours of the package are maintained from the top to the bottom of the retail configuration by the internal plastic CD holder 12, all three portions providing uniform thickness and a visual impact of strength and quality. The consistent thickness is half of the thickness of the existing retail long box. However, the entire CD package in the storage configuration is the same size as the conventional jewel box.

After purchase, the consumer removes the shrink wrap, unfolds the cover and pivots the flip panels into the central panel. The CD holder is then lifted slightly, a projection formed on the underside thereof overcoming a cutout formed in the cardboard cover and moved onto an adjacent cover portion between two strips. When the CD holder is fully in place on the adjacent portion, the above-described projection as well as another projection secure the tray in position between two cutouts. The cardboard cover can then be folded up into the storage configuration.

Figure 11:
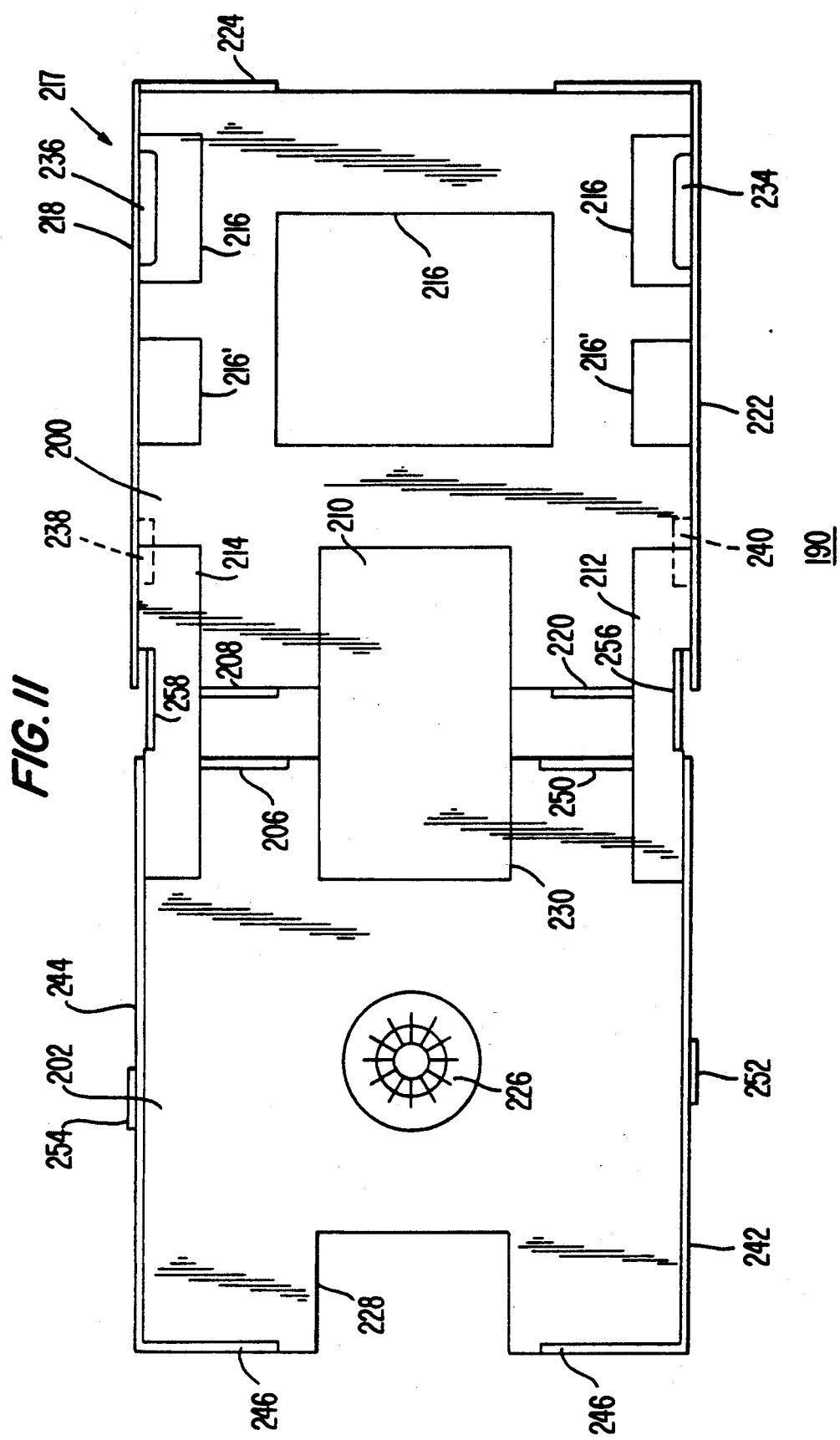
FIG. 11 is a top view of an alternate embodiment of the CD holder according to a preferred embodiment in the retail position.
Figure 12:
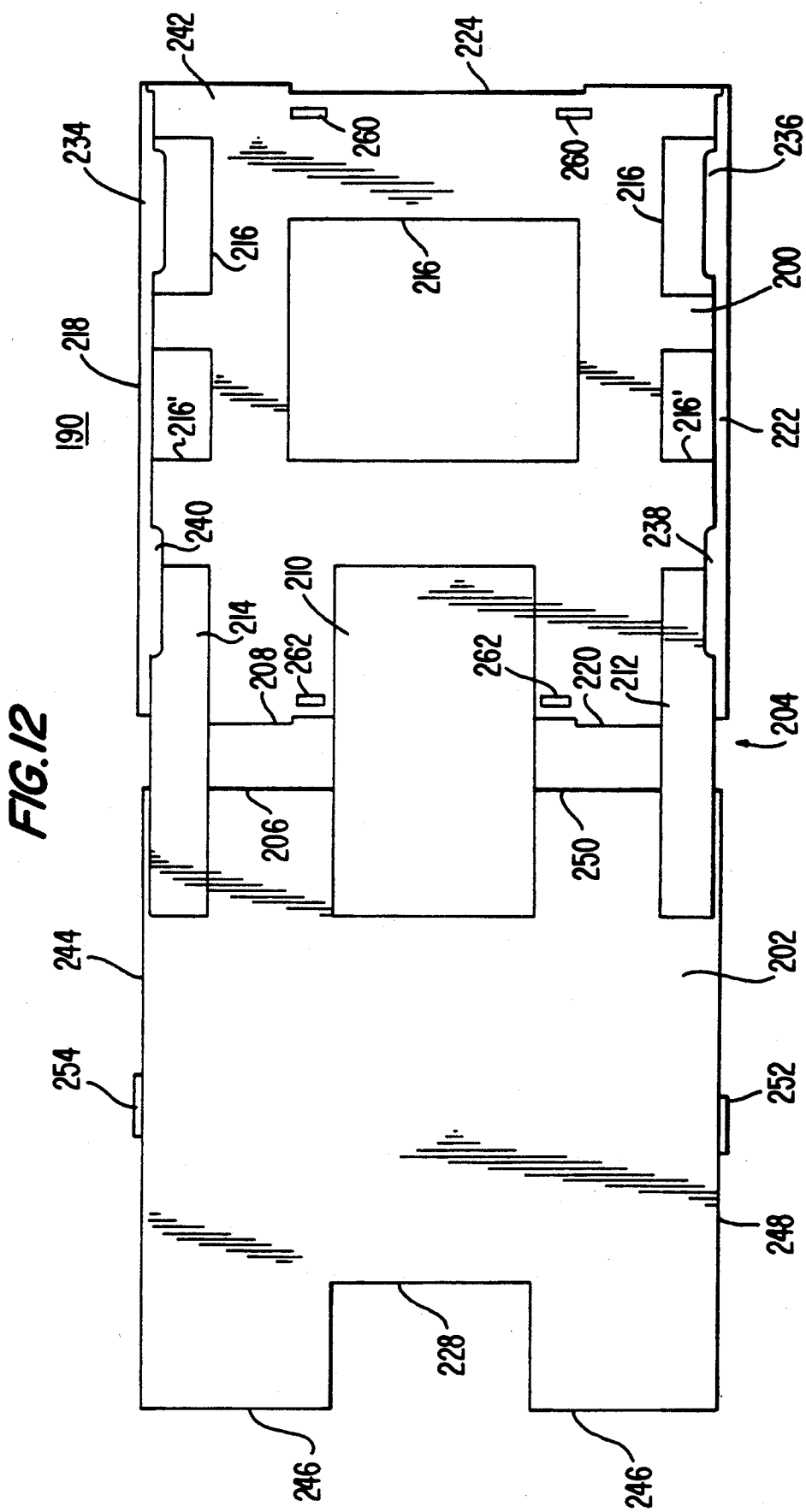
FIG. 12 is a bottom view of the alternate embodiment of the CD holder shown in FIG. 11.
Figure 13:
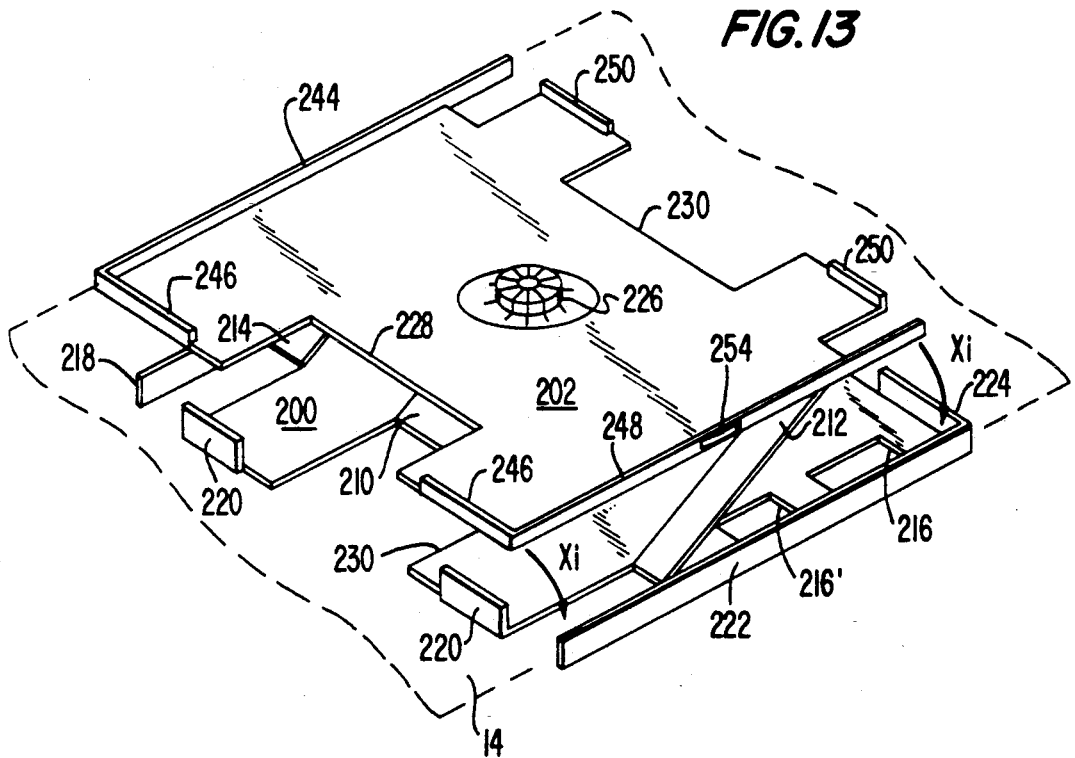
FIG. 13 is a perspective view of the alternate embodiment of the CD holder being pivoted closed so that it can be moved from the retail to the storage position.

FIGS. 11-13 illustrate the second embodiment of a CD holder 190 according to the present invention. In the second embodiment, first and second nesting rectangular panels 200, 202, respectively, are connected by pivotable means 204 at adjacent respective sides 206, 208 of the panels. In this embodiment, there are preferably three hinges making up the pivotable means 204; a central large hinge 210, and two lateral smaller hinges 212, 214. Again, the CD holder 190 can be integrally molded to include living hinges, or can be molded of separate members which are connected together.

The first panel 200 includes cutouts 216, which help conserve materials, and each side includes an upstanding wall 218, 220, 222 and 224. The side walls 244 and 248 include small projections 252, 254 which create an interference fit with the insides of the walls 218, 222 of the first panel 200, when the second panel 202 is pivoted into the first panel 200. Further, elongated projections 256, 258 fit into cutouts 216, in this folded configuration. The underside 242 of the first panel 200 also includes cover receiving means 217 in the form of clasps 234, 236, 238, 240.

The second panel 202 includes a CD receiving means 226, like the means 30, described above, and four upstanding side walls 244, 246, 248 and 250. This second panel 202 also includes a cutout 228 in wall 246. This cutout 228 acts as finger hole when the second panel 202 is folded on top of the first panel 200, as described below. A cutout 230 forming the hinge 210 creates an opposite finger hole, again, in the folded position.

FIG. 12 illustrates particularly the clasps 234-240 formed on the underside 242 of the first panel 200. Also, there is a pair of projections 260, near wall 224, and another pair of projections 262 near wall 220 which serve the same purpose as the projections 168, 170 described above for locating the CD holder 190 relative to the cover 14 in the retail and storage configurations.

The cover for this embodiment, the means for slidably attaching and the related methods of mating are the same for this embodiment as for the first embodiment described above.

As shown particularly in FIG. 11, when the panels 200, 202 are in the coplanar retail position, the hinges 210, 212, 214 would extend along the strips 116 and 120 of the cover 14 which, along with the rectangular panels 200, 202 and cardboard cover 14, would produce the rigid long box, which is then shrink wrapped.

As shown in FIG. 13, after the consumer removes the shrink wrap and CD, he pivots the panels 200, 202 into the nested position, moves the CD holder 190 upward slightly and then longitudinally of the cardboard cover 14 and folds the cardboard cover over 14 the CD holder 190, as described above for the first embodiment.

As can be seen from the above description, if a defect is found during manufacture in either the CD holder or cover, these two members can be easily separated by removing the cover from the clasps. The non-defective member can be reused and the defective part recycled. Similarly, when the CD package is ultimately discarded, the CD holder can be easily separated from the cardboard cover and each member can be re-used or recycled. As the total materials used is less than conventional CD packages, and due to the enhanced recycling/reuse abilities described above, the final cost of producing the CD package is also decreased. Further, the conventional likelihood of the CD holder being glued incorrectly during assembly is eliminated.

The foregoing is considered illustrative only of the principles of the invention. Further, since numerous modifications and changes will readily occur to those skilled in the art, it is not desired to limit the invention to the exact construction and operation shown and described. For example, although the preferred shape to date for CD holders has been rectangular, it is also possible to make the present invention, including both the CD holder and cardboard cover, substantially circular, oval, etc. The above-described package has been shown to be of the type intended for use with conventional regularly-sized CDs. However, the invention can be similarly applied to, e.g., floppy discs, laser discs, records, etc.

We claim:

1. A compact disc package, comprising:
   (a) a flat cover including a plurality of substantially similarly dimensioned foldable portions delineated by a plurality of fold lines;
   (b) a CD holder, including
      (i) a first planar panel which directly receives the CD thereon,
      (ii) a second planar panel, and
      (iii) means for pivotally connecting the first and second panels;
   (c) means formed on a bottom of the CD holder for containing the cover in sliding relation along the bottom of the CD holder;
   wherein the CD holder is slidable between a first position where the second panel is pivoted relative to the first panel into an unfolded coplanar configuration and the bottom of the CD holder abuts more than one of the plurality of foldable portions of the cover, and a second position where the second panel is pivoted relative to the first panel into a folded parallel configuration and the bottom of the CD holder abuts only one of the plurality of foldable portions of the cover.

2. The package as recited in claim 1, wherein the CD holder further comprises:
   (iv) a third planar panel pivotally connected to the first panel,
   wherein the second and third panels are arranged opposite relative to the first panel, and
   wherein said second and third panels are each pivotable between an unfolded configuration coplanar with the first panel and a folded configuration in a plane parallel to the plane of the first panel.

3. The package as recited in claim 2, wherein the CD holder is a one-piece, unitary integrally molded plastic member.

4. The package as recited in claim 2, wherein the second and third panels are connected to the first panel by integrally molded plastic living hinges.

5. The package as recited in claim 2, wherein each of the first, second and third panels further comprise continuous side walls.

6. The package as recited in claim 1, wherein the cover comprises four collinear portions, separated by three, walled strips.

7. The package as recited in claim 1, further comprising means for temporarily maintaining the first position.

8. The package as recited in claim 1, further comprising means for temporarily maintaining the second position.

9. A compact disc package, comprising:

(a) a cover including a plurality of foldable portions;
(b) a CD holder; and
(c) means formed on the CD holder for receiving the cover in sliding relation,
 wherein the means for receiving the cover in sliding relation comprises a plurality of clasps extending from opposing sides on a bottom of the CD holder.

10. A compact disc package, comprising:
(a) a cover including a plurality of foldable portions separated by strips;
(b) a CD holder; and
(c) means formed on the CD holder for receiving the cover in sliding relation,
 wherein the cover comprises eight panels, four of which are folded over the other four and affixed thereto, to form four portions of the cover.

11. The package as recited in claim 10,
 wherein the CD holder includes a first panel pivotable relative to a second panel,
 wherein the CD holder is slidable between a first position where the second panel is pivoted relative to the first panel into an unfolded coplanar configuration, and
 wherein in the unfolded coplanar configuration, two of the plurality of foldable portions of the cover abut a bottom of the CD holder and two of the plurality of foldable portions abut a top of the CD holder and a strip abuts each opposite side of the first panel adjacent the means for connecting.

12. The package as recited in claim 11, further comprising a shrink wrap extending over the cover and the CD holder.

13. The package as recited in claim 11, wherein, in the folded parallel configuration, the remaining foldable portions of the cover are folded over the CD holder, with the strips at the opposite sides of the first panel adjacent the means for connecting.

14. The package as recited in claim 13, further comprising means for temporarily removably attaching an end cover portion folded over the CD holder to another cover portion.

15. A compact disc package, comprising:
(a) a cover including a plurality of foldable portions;
(b) a CD holder; and
(c) means formed on the CD holder for receiving the cover in sliding relation,
 wherein the CD holder includes
 (i) a first planar panel,
 (ii) a second planar panel,
 (iii) means for pivotally connecting the first and second panels, and
 (iv) a third planar panel pivotally connected to the first panel,
 wherein the second and third panels are arranged opposite relative to the first panel,
 wherein the CD holder is slidable between a first position where the second and third panels are pivoted relative to the first panel into an unfolded coplanar configuration, and a second position where the second and third panels are pivoted relative to the first panel into a folded configuration wherein the second and third panels are parallel to the first panel, and
 wherein each of the second and third panels has a substantially semicircular cutout and the two cutouts combine, when the second and third panels are in the folded configuration, to form a circle having a diameter slightly greater than a diameter of a CD.

16. The package as recited in claim 15, further comprising means for temporarily maintaining the first position.

17. The package as recited in claim 15, further comprising means for temporarily maintaining the second position.

18. A compact disc package, comprising:
(a) a cover including a plurality of foldable portions;
(b) a CD holder; and
(c) means formed on the CD holder for receiving the cover in sliding relation,
 wherein the CD holder includes
 (i) a first planar panel,
 (ii) a second planar panel, and
 (iii) means for pivotally connecting the first and second panels,
 (iv) a third planar panel pivotally connected to the first panel,
 wherein the second and third panels are arranged opposite relative to the first panel,
 wherein the CD holder is slidable between a first position where the second and third panels are pivoted relative to the first panel into an unfolded coplanar configuration and a second position where the second and third panels are pivoted relative to the first panel into a folded configuration wherein the second and third panels are parallel to the first panel, and
 wherein the first, second and third panels comprise latch means, for receiving in temporary fixed position, the second and third panels relative to the first panel, when the second and third panels are in the folded configuration.

19. The package as recited in claim 18, further comprising means for temporarily maintaining the first position.

20. The package as recited in claim 18, further comprising means for temporarily maintaining the second position.

21. A compact disc package, comprising:
(a) a cover including a plurality of foldable portions, formed from an elongated rectangular blank prescored into a first row of first through fourth sections, and a parallel second row of fifth through eighth sections, the two rows being separated by a longitudinal fold line, and
 wherein graphics are applied to at least one of the sections, the first through fourth sections are separated from each other by slots, and the fifth through eighth sections are separated from each other by strips which are bounded respectively by fold lines;
(b) a CD holder; and
(c) means formed on the CD holder for receiving the cover, in sliding relation.

22. The package as recited in claim 21, wherein the second section includes on transverse sides and interiorly thereof cutouts, for receiving projections formed on the underside of the first panel.

23. The package as recited in claim 22, wherein the second, third, sixth and seventh sections are slightly narrower in the transverse direction than the first, fourth, fifth and eighth sections.

24. A compact disc package, comprising:
(a) a cover including four portions separated by strips;

(b) a CD holder, including
  (i) a first planar panel,
  (ii) a second planar panel pivotally connected to the first panel, and
  (iii) a third planar panel pivotally connected to the first panel,
  wherein the second and third panels are arranged opposite relative to the first panel, and
  wherein the CD holder is slidable between a first position where the second and third panels are pivoted relative to the first panel into an unfolded configuration coplanar to the first panel and a second position where the second and third panels are pivoted relative to the first panel into a folded configuration in a plane parallel to the plane of the first panel;
(c) means formed on the CD holder for receiving the cover in sliding relation,
  wherein, in the unfolded coplanar configuration, two of the plurality of foldable portions of the cover abut the bottom of the CD holder and two of the plurality of foldable portions of the cover abut a top of the CD holder, and a strip abuts each opposite side of the first panel adjacent the means for connecting, and
  wherein, in the folded parallel configuration, the remaining foldable portions of the cover are folded over the CD holder.

25. The package as recited in claim 24, further comprising means for temporarily maintaining the first position.

26. The package as recited in claim 24, further comprising means for temporarily maintaining the second position.

27. A compact disc package, comprising:
(a) a cover including four portions separated by strips;
(b) a CD holder, including
  (i) a first planar panel, and
  (ii) a second planar panel pivotally connected to the first panel,
  wherein the CD holder is slidable between a first position where the second panel is pivoted relative to the first panel into an unfolded coplanar configuration and a second configuration where the second panel is pivoted relative to the first panel into a folded configuration wherein the second panel is parallel to and nesting in the first panel; and
(c) means formed on the CD holder for receiving the cover in sliding relation,
  wherein, in the unfolded coplanar configuration, two of the plurality of foldable portions of the cover abut a bottom of the CD holder and two of the plurality of foldable portions abut a top of the CD holder, and a strip abuts each opposite side of the first panel adjacent the means for connecting, and
  wherein in the folded parallel configuration, the remaining foldable portions of the cover are folded over the CD holder.

28. The package as recited in claim 27, further comprising means for temporarily maintaining the first position.

29. The package as recited in claim 27, further comprising means for temporarily maintaining the second position.

30. A method for manufacturing a CD package, comprising the steps of:
(a) forming a CD holder having a pair of planar portions connected by a hinge, and means for slidably receiving a cover, said CD holder being movable between a first unfolded coplanar configuration and a second folded parallel configuration;
(b) forming a flat cover having a pair of planar portions connected by a hinge and being movable between a first unfolded configuration and a second folded configuration; and
(c) mechanically mating the cover and the means formed on the CD holder for slidably receiving; and
(d) moving the cover relative to the holder so that in the first configuration the respective hinges do not coincide, and in the second configuration the respective hinges do coincide.

31. The method as recited in claim 30, wherein step (c) comprises the step of:
moving the cover in the first unfolded configuration parallel to the CD holder to mate the cover and the means for slidably receiving.

32. The method as recited in claim 30, wherein step (c) comprises the step of:
bending the cover in the first unfolded configuration longitudinally;
fitting the bent cover between the means for slidably receiving; and
releasing the cover to mate the cover and the means for slidably receiving.

33. A method for manufacturing a CD package, comprising the steps of:
(a) forming a CD holder with means for slidably receiving a cover, a first planar member with means for directly receiving a CD thereon and a second planar member capable of being pivoted into an unfolded position coplanar to the first member;
(b) forming a cover with a plurality of foldable planar portions;
(c) mating the cover with the CD holder via the means for slidably receiving;
(d) pivoting the second planar member into the unfolded position; and
(e) folding the cover over an exterior of the unfolded CD holder.

34. The method as recited in claim 33, further comprising the step of:
(f) shrink wrapping the cover over the CD holder.

35. A method for manufacturing a CD package, comprising the steps of:
(a) forming a CD holder with means for slidably receiving a cover, a first planar member and a second planar member capable of being pivoted between an unfolded position coplanar to the first member and a folded configuration in a plane parallel to the first member;
(b) forming a cover with a plurality of portions separated by strips;
(c) mating the cover with the CD holder via the means for slidably receiving;
(d) pivoting the first and second planar members into the unfolded configuration;
(e) extending the cover over the CD holder;
(f) shrink wrapping the cover on the CD holder;
(g) removing the shrink wrap;
(h) pivoting the first and second members into the folded configuration;
(i) sliding the CD holder relative to the cover via the means for slidably receiving; and
(j) folding the cover over the CD holder.

* * * * *